(12) United States Patent
Noda et al.

(10) Patent No.: US 9,376,547 B2
(45) Date of Patent: Jun. 28, 2016

(54) POLYMER PRODUCTION METHOD

(71) Applicant: KANEKA CORPORATION, Osaki-shi, Osaka (JP)

(72) Inventors: Koji Noda, Tokyo (JP); Ryohei Ishimaru, Takasago (JP); Satohiro Yanagisawa, Tokyo (JP); Masashi Izumida, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/775,184

(22) PCT Filed: Mar. 12, 2014

(86) PCT No.: PCT/JP2014/056516
§ 371 (c)(1),
(2) Date: Sep. 11, 2015

(87) PCT Pub. No.: WO2014/142177
PCT Pub. Date: Sep. 18, 2014

(65) Prior Publication Data
US 2016/0024275 A1 Jan. 28, 2016

(30) Foreign Application Priority Data
Mar. 14, 2013 (JP) .................................. 2013-052288

(51) Int. Cl.
| C08K 5/35 | (2006.01) |
| C08F 2/26 | (2006.01) |
| C07K 1/14 | (2006.01) |
| C07K 1/36 | (2006.01) |

(52) U.S. Cl.
CPC .... *C08K 5/35* (2013.01); *C08F 2/26* (2013.01)

(58) Field of Classification Search
CPC .................................... C08K 5/35; C08L 2/26
USPC ........................................... 524/719; 530/323
See application file for complete search history.

(56) References Cited

U.S. PATENT DOCUMENTS

2013/0197190 A1* 8/2013 Izumida ................... C07K 7/06
530/323

FOREIGN PATENT DOCUMENTS

| JP | 2003128512 A | 5/2003 |
| JP | 2005-15353 A | 1/2005 |
| JP | 2005-15537 A | 1/2005 |
| JP | 2005015353 A * | 1/2005 |
| JP | 2007-29612 A | 11/2007 |
| JP | 2008-162975 A | 7/2008 |
| JP | 2009-155306 A | 7/2009 |
| JP | 2010-284519 A | 12/2010 |
| WO | WO 2007/126067 A1 | 11/2007 |
| WO | WO 2010/125691 A1 | 11/2010 |
| WO | WO 2012/043800 A1 | 4/2012 |

* cited by examiner

*Primary Examiner* — Kelechi Egwim
(74) *Attorney, Agent, or Firm* — Birch, Stewart, Kolasch & Birch, LLP

(57) ABSTRACT

The objective of the present invention is to provide a method for producing a polymer of a monomer having a vinyl group while reducing a residual amount of a surfactant within the polymer as the target compound and waste water. The method for producing a polymer according to the present invention is characterized in comprising the step of polymerizing a monomer having a vinyl group in an aqueous medium in the presence of a surfactin salt, which is a natural peptide surfactant, and a polymerization initiator, wherein a ratio of the surfactin salt (I) to 100 parts by mass of the monomer is not less than 0.0005 parts by mass and less than 0.1 parts by mass.

5 Claims, 1 Drawing Sheet

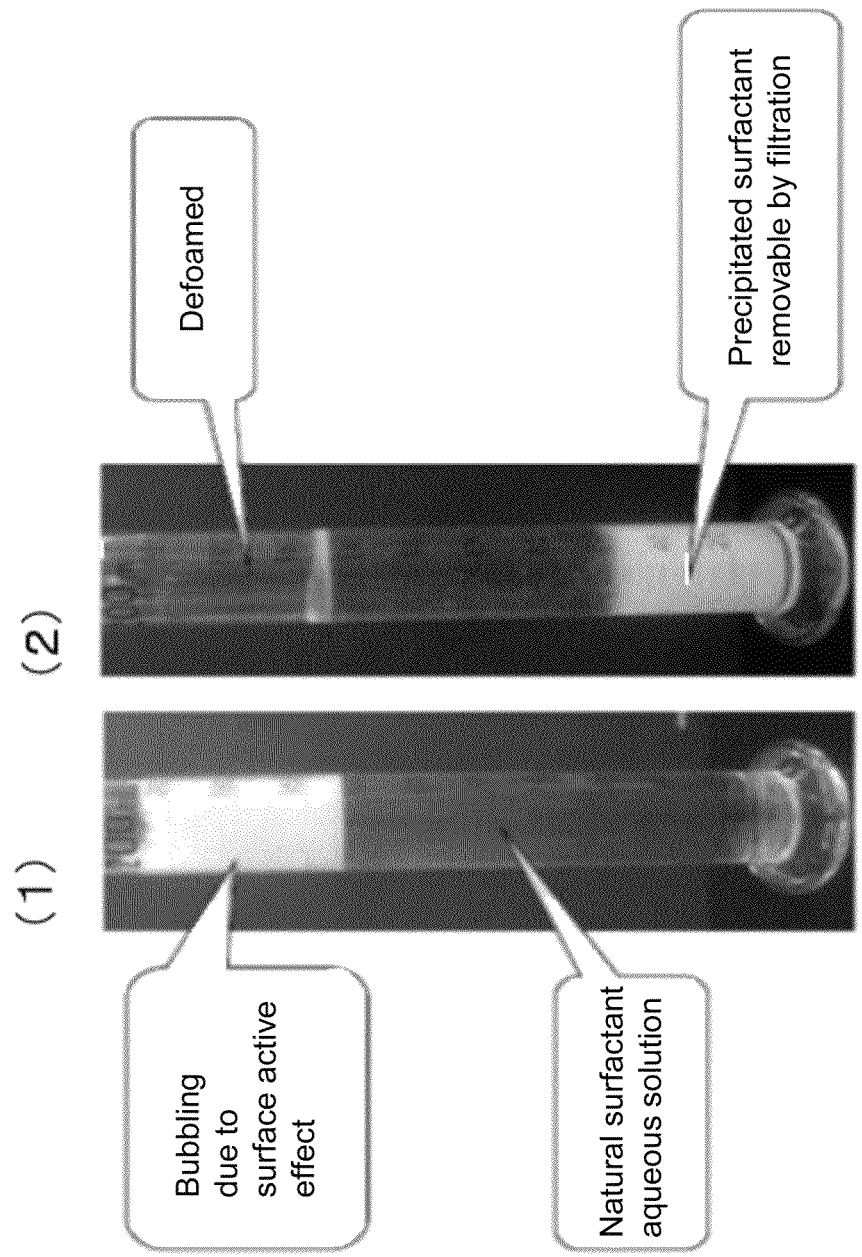

POLYMER PRODUCTION METHOD

TECHNICAL FIELD

The present invention relates to a method for polymerizing a monomer having a vinyl group to produce a polymer. According to the present invention method, the residual amount of a surfactant in the polymer and a waste water can be remarkably reduced.

BACKGROUND ART

There are various methods for polymerizing a monomer having a vinyl group. Among the methods, an emulsion polymerization method and a suspension polymerization method are important. Since an aqueous medium is used in the methods, the methods are advantageous in that the heat produced by a polymerization reaction is readily removed and it is easy to control the reaction temperature. In addition, the methods are also advantageous in that a product polymer is obtained in the form of a small particle; and therefore, can be readily separated from the reaction mixture, washed and dried.

For more details, in an emulsion polymerization method, a monomer is polymerized using a surfactant and a polymerization initiator in an aqueous medium. A monomer having a vinyl group generally exhibits insolubility or poor solubility in water; however, the monomer is dispersed in an aqueous medium by being entrapped in a micelle composed of surfactants. In such a micelle, the monomer is polymerized by the action of a radical generated from the polymerization initiator. A polymer obtained by an emulsion polymerization method has excellent properties. Specifically, the size of the micelle is about several nanometers, and the polymer is extremely small, that is, as small as from several tens nanometers to several hundreds nanometers. However, the polymer has a high polymerization degree. A dispersion of a polymer obtained by an emulsion polymerization method may be directly used as paint, adhesive or the like in some cases.

In suspension polymerization, a monomer and a polymerization initiator are vigorously stirred to polymerize the monomer in an aqueous medium using a machine to form liquid drops of the monomer generally without using any surfactant. Such a liquid drop is larger than a micelle in an emulsion polymerization method and is usually in a size as large as about 0.01 to 1 mm. There is a fear that the liquid drops may be combined with each other to form a large particle, thereby impairing benefits inherent in suspension polymerization. In order to stabilize the liquid drops, a water-soluble polymer, such as gelatin, starch, polyvinyl alcohol and carboxymethylcellulose, and an insoluble powder, such as calcium carbonate and magnesium carbonate, are added.

However, a polymer obtained by an emulsion polymerization method or a suspension polymerization method has the problem that the above-mentioned surfactant and a liquid drop stabilizer are mixed into the polymer to impair properties inherent in the polymer. Such surfactant and liquid drop stabilizer are also mixed into waste water after the polymer is separated, and it is necessary to reduce amounts of the surfactant and liquid drop stabilizer in the waste water since some of the compounds have a bad influence on the environment. On the one hand, when a monomer that exhibits insolubility or poor solubility in water is subjected to emulsion polymerization and the like, a prescribed amount of a surfactant and the like is required in order to disperse a micelle or a liquid drop of the monomer.

As a biosurfactant, which is a surfactant derived from an organism, surfactin is known. Surfactin has a cyclic peptide structure, and exhibits an excellent surfactant action since the structure of the cyclic moiety that exhibits hydrophilicity is significantly larger than that of a conventional surfactant. For example, a sodium salt thereof therefore has been used for cosmetics and the like as a surfactant (Patent Document 1).

In Patent Documents 2 to 9, surfactin is exemplified as a surfactant used for an emulsion polymerization method.

PRIOR ART DOCUMENT

Patent Document

Patent Document 1: JP 2003-128512 A
Patent Document 2: JP 2005-15353 A
Patent Document 3: JP 2005-15537 A
Patent Document 4: JP 2007-296120 A
Patent Document 5: JP 2008-162975 A
Patent Document 6: JP 2009-155306 A
Patent Document 7: JP 2010-284519 A
Patent Document 8: WO 2007/126067
Patent Document 9: WO 2010/125691

DISCLOSURE OF THE INVENTION

Problems to be Solved by the Invention

As described above, when a polymer is produced by emulsion polymerization or suspension polymerization, contamination of a surfactant, a water-soluble polymer or the like into the polymer or waste water has been considered as a problem. However, in order to satisfactorily carry out emulsion polymerization or suspension polymerization, it is impossible to reduce the amount of a surfactant, water-soluble polymer or the like.

Patent Documents 2 and 3 disclose specific examples of an emulsion polymerization method using sodium surfactin. However, in the examples, sodium surfactin is used in an amount similar to that of conventionally common conditions. Specifically 2.4 mass % of sodium surfactin to a monomer is used. In addition, sodium lauryl sulfate, which is a surfactant other than sodium surfactin, is used in combination. It is therefore assumed that a surfactant in a similar amount to a conventional amount is mixed in a polymer.

Patent Documents 4 to 9 disclose sodium surfactin as an emulsion polymerization surfactant for preparing an adhesive for an adhesive patch. However, sodium surfactin is merely one of many examples, and not only a specific example using sodium surfactin but also a specific example of emulsion polymerization is not disclosed.

Under the above-described circumstance, the objective of the present invention is to provide a method for producing a polymer of a monomer having a vinyl group while reducing a residual amount of a surfactant within waste water and the polymer as the target compound.

Means for Solving the Problems

The present inventors studied earnestly in order to solve the above-described problem. As a result, the inventors found that when a surfactin salt is used as a surfactant, a monomer having a vinyl group can be efficiently polymerized even if the use amount of a surfactin salt is reduced, and the residual amount of a surfactant in waste water and the polymer as the target compound can be remarkably reduced, and thus completed the present invention.

Hereinafter, the present invention is described.

[1] A method for producing a polymer, comprising the step of polymerizing a monomer having a vinyl group in an aqueous medium in the presence of a polymerization initiator and a surfactin salt represented by the following formula (I):

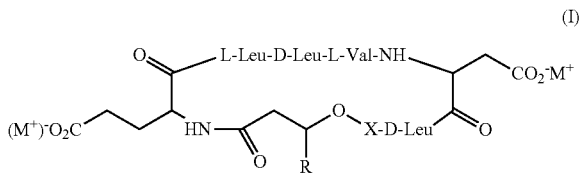

wherein 'X' is a residue of an amino acid selected from leucine, isoleucine and valine;
'R' is a $C_{9-18}$ alkyl group;
'M+' is an alkali metal ion or a quaternary ammonium ion;
wherein a ratio of the surfactin salt (I) to 100 parts by mass of the monomer is not less than 0.0005 parts by mass and less than 0.1 parts by mass.

Conventionally, when a surfactant is used in such a small amount, it is impossible to stabilize a micelle of a monomer and a liquid drop in an aqueous medium. On the one hand, the surfactin salt (I) is used as a surfactant in the present invention. As a result, even when the amount of the surfactin salt (I) is reduced, it becomes possible to carry out emulsion polymerization and suspension polymerization, and also to remarkably reduce the amount of the surfactant in the polymer and waste water.

[2] The method according to the above [1], further comprising the steps of:
separating the obtained polymer from the liquid phase;
adding a polyvalent metal ion to the separated liquid phase in order to coagulate the surfactin salt; and
separating the coagulated surfactin salt.

According to the aspect, it can be inhibited to mix the surfactin salt in the polymer and additionally, the used surfactin salt can be recovered to be reused.

[3] The method according to the above [2], wherein further comprising the step of adding an alkali metal ion to the polymerization reaction mixture in order to coagulate the polymer after the step of polymerizing the monomer and before the step of separating the polymer.

Though the polymer is coagulated by the alkali metal ion, the surfactin salt remains dissolved in the aqueous medium. It therefore becomes possible to reduce the surfactin salt mixed in the polymer to much smaller amount.

[4] The method according to any one of the above [1] to [3], wherein the ratio of the surfactin salt (I) to 100 parts by mass of the monomer is not more than 0.05 parts by mass.

When a conventional surfactant is used in such a small amount, it is impossible to carry out emulsion polymerization and suspension polymerization; however, it is possible when the surfactin salt (I) is used. As a result, it becomes possible to remarkably reduce the amount of the surfactant in the polymer and waste water.

[5] The method according to any one of the above [1] to [4], wherein the monomer is a (meth)acrylic acid-based monomer.

In the present invention, the term "(meth)acrylic acid-based monomer" means acrylic acid, methacrylic acid, and a derivative of (meth)acrylic acid, such as ester and amide.

Effect of the Invention

According to the present invention method, a high quality polymer of which residual amount of a surfactant is remarkably reduced can be produced. In addition, since a residual amount of a surfactant in waste water can also be reduced remarkably, it is not necessary to treat waste water or the time and effort for the treatment can be reduced. Moreover, a surfactin salt used as a surfactant in the present invention method is a peptide; therefore, is rapidly decomposed by bacteria or the like even if released to the environment. As a result, the load on the environment due to a surfactin salt is very small. The present invention is therefore excellent in an industrial aspect as a substitute for the conventional polymer production methods.

BRIEF DESCRIPTION OF THE DRAWINGS

FIG. 1 includes photograph (1) of about 150 mL of a 0.05 mass % aqueous sodium surfactin solution, and photograph (2) showing the result of adding 1 mL of a saturated aqueous calcium chloride solution to the solution, followed by stirring. In FIG. 1(2), it can be observed that dissolved sodium surfactin forms a calcium salt to be precipitated and deposited.

MODE FOR CARRYING OUT THE INVENTION

The method for producing a polymer according to the present invention is characterized in comprising the step of polymerizing a monomer which has a vinyl group in the presence of the surfactin (I) and a polymerization initiator in an aqueous medium, wherein a ratio of the surfactin salt (I) to 100 parts by mass of the monomer is not less than 0.0005 parts by mass and less than 0.1 parts by mass. Hereinafter, the present invention method is described in the order of the exploitation of the invention.

(1) Polymerization Step

In the present invention, the surfactin salt represented by the following formula (I):

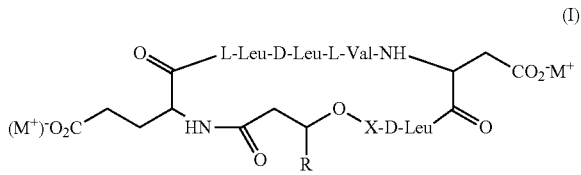

wherein 'X' is a residue of an amino acid selected from leucine, isoleucine and valine; 'R' is a $C_{9-18}$ alkyl group; 'M+' is an alkali metal ion or a quaternary ammonium ion; is used as a surfactant. The surfactin salt can form a micelle in emulsion polymerization and can stabilize a liquid drop in suspension polymerization even in a smaller amount than that in conventional polymerization conditions.

Although the amino acid residue as 'X' may be either in a L-form or a D-form, the L-form is preferred.

The term "$C_{9-18}$ alkyl group" refers to a linear or branched monovalent saturated hydrocarbon group having not less than 9 and not more than 18 carbon atoms. The example thereof includes n-nonyl, 6-methyloctyl, 7-methyloctyl, n-decyl, 8-methylnonyl, n-undecyl, 9-methyldecyl, n-dodecyl, 10-methylundecyl, n-tridecyl, 11-methyldodecyl, n-tetradecyl, n-pentadecyl, n-hexadecyl, n-heptadecyl and n-octadecyl.

The alkali metal ion is not particularly restricted and represents a lithium ion, a sodium ion, a potassium ion or the like.

The example of a substituent of the quaternary ammonium ion includes an organic group, for example, an alkyl group such as methyl, ethyl, n-propyl, isopropyl, n-butyl and tert-butyl; an aralkyl group such as benzyl, methylbenzyl and phenylethyl; and an aryl group such as phenyl, toluyl and xylyl. The quaternary ammonium ion is exemplified by a tetramethylammonium ion, a tetraethylammonium ion and a pyridinium ion.

Either one of the surfactin salts or two or more salts may be used.

The surfactin salt obtained by culturing a microorganism such as a strain belonging to *Bacillus subtilis* and separating from the culture broth according to a conventional method. Both of a purified product and an unpurified product of the surfactin salt can be used. Such an unpurified product is exemplified by a culture broth as it is. The product of the surfactin salt obtained by a chemical synthesis method may be similarly used.

In the present invention method, the surfactin salt is used in an amount of not less than 0.0005 parts by mass and less than 0.1 parts by mass to 100 parts by mass of the monomer. According to the findings by the inventors of the present invention, the surfactin salt is very excellent as a surfactant for emulsion polymerization or the like, and even when the above ratio is less than 0.1 parts by mass, it is possible to form a micelle, stabilize a liquid drop, and accelerate polymerization effectively. As a result, it becomes possible to remarkably reduce the residual amount of the surfactant in the polymer or waste water. However, the ratio is adjusted to not less than 0.0005 parts by mass, since if the salt is used in an excessively small amount, polymerization may possibly not be carried out efficiently. The above-described ratio is preferably not less than 0.0006 parts by mass and not more than 0.05 parts by mass, more preferably not less than 0.0008 parts by mass and not more than 0.02 parts by mass, and particularly preferably not less than 0.001 parts by mass and not more than 0.01 parts by mass.

The polymerization initiator may appropriately be selected. The polymerization initiator is exemplified by an organic peroxide, an inorganic peroxide and an azo compound, but is not restricted thereto. The organic peroxide is exemplified by a peroxide of a ketone or an aldehyde, such as cyclohexanone peroxide; a diacyl peroxide such as acetyl peroxide; a hydroperoxide such as t-butyl hydroperoxide and cumene hydroperoxide; a dialkyl peroxide such as di-t-butyl peroxide; an alkyl perester such as t-butyl perisobutyrate; and a percarbonate such as t-butyl peroxyisopropyl carbonate. The inorganic peroxide is exemplified by hydrogen peroxide and potassium persulfate. The azo compound is exemplified by 2,2'-azobisisobutyronitrile. The polymerization initiator is not restricted to the above examples. When the organic peroxide and/or inorganic peroxide among the above examples is used, the peroxide may be used as a heat decomposition-type polymerization initiator, or alternatively may be used as a redox-type polymerization initiator in combination with a reducing agent such as sodium ascorbate or formaldehyde sodium sulfoxylate, and as necessary, a co-catalyst such as ferrous sulfate, and a chelating agent such as ethylenediaminetetraacetate. When emulsion polymerization is carried out, a water-soluble polymerization initiator is used; and when suspension polymerization is carried out, an oil-soluble polymerization initiator is used.

An amount of the polymerization initiator to be used may appropriately be adjusted, and may be adjusted to, for example, not less than 0.1 parts by mass and not more than 5 parts by mass to 100 parts by mass of the monomer.

The reducing agent that can be used with a polymerization initiator in combination may be used. The reducing agent is exemplified by sodium hydrogen sulfite, sodium sulfoxylate formaldehyde and sodium pyrosulfite.

An amount of the reducing agent to be used may also be appropriately adjusted, and may be adjusted to, for example, not less than 0.1 parts by mass and not more than 5 parts by mass to 100 parts by mass of the monomer.

The aqueous medium used in the present invention method refers to a medium that contains water as a main component. The aqueous medium may be either water alone or a mixed medium of water and a water-miscible medium. The kind of water used in the present invention is not particularly restricted, and any type of water such as distilled water, pure water, ultrapure water and tap water can be used. When a mixed medium of water and a water-miscible medium is used, the ratio of water in the mixed medium is adjusted to not less than 50% by volume. The ratio is preferably not less than 60% by volume, more preferably not less than 70% by volume, and particularly preferably not less than 80% by volume. More preferably, water alone is used as the medium.

The water-miscible medium used with water in combination is exemplified by an alcohol such as methanol and ethanol; an ether such as tetrahydrofuran; a ketone such as acetone; and an amide such as dimethylformamide and dimethylacetamide. However, any organic media which are miscible with water at ordinary temperature may be used without particular restriction.

The monomer to be polymerized in the present invention method is a monomer having a vinyl group, which is radical-polymerizable. The example thereof includes a vinyl ester-based monomer such as vinyl acetate and vinyl propionate; an aromatic vinyl compound-based monomer such as styrene and vinyltoluene; a α-olefin-based monomer such as ethylene and propylene; a (meth)acrylic acid-based monomer such as (meth)acrylic acid, methyl (meth)acrylate, 2-hydroxyethyl (meth)acrylate, ethylene glycol di(meth)acrylate, (meth) acrylic amide and diacetone acrylamide; and a halogenated vinyl-based monomer such as vinyl chloride, vinylidene chloride and vinylidene fluoride. One of the monomers may be used alone, or alternatively two or more monomers may be used in combination to be copolymerized.

An amount of the monomer to be used is not particularly restricted and may be appropriately adjusted. For example, the amount may be adjusted to not less than 20 parts by mass and not more than 100 parts by mass to 100 parts by mass of the aqueous medium.

With respect to specific conditions of the reaction, a conventional method may be referred to. For example, in the case of emulsion polymerization, a part of the aqueous medium, a part of the water-soluble polymerization initiator, a part of the surfactin salt (I) and the monomer are mixed to prepare a pre-emulsion in advance, the remaining aqueous medium, polymerization initiator and surfactin salt (I) are separately mixed to be a solution, and the pre-emulsion may be added dropwise to the stirred solution. In the case of suspension polymerization, a mixture containing at least the surfactin salt (I), an oily polymerization initiator, the monomer and the aqueous medium is vigorously stirred to be reacted while liquid drops are stabilized.

It is preferred that the reaction atmosphere is replaced by an inert gas such as nitrogen gas and argon gas in order to stabilize a radical necessary for the polymerization reaction. For the same reason, it is preferred to remove dissolved oxygen from the aqueous medium by treatment such as blowing an inert gas into the aqueous medium.

The reaction temperature and the reaction time are not particularly restricted and may be appropriately adjusted. For example, the reaction temperature may be adjusted approximately to not lower than 40° C. and not higher than 120° C., and the reaction time may be adjusted approximately to not shorter than 1 hour and not longer than 20 hours.

(2) Step of Coagulating Polymer

The reaction mixture obtained in the above-described polymerization step, particularly the reaction mixture obtained by emulsion polymerization, can be directly used as adhesive, paint or the like. In the present invention, since the surfactin salt is used as a surfactant and the amount thereof is smaller than heretofore, the amount of the surfactant which is mixed in the resulting reaction mixture, i.e. latex, is also smaller and a negative effect by the surfactant is considered to be reduced.

However, the polymer may be separated from the liquid phase in order to further reduce the surfactant. For such a purpose, the polymer is coagulated in the present step. It is however noted that the present step is optional and may not be carried out.

In the present invention, the polymer is preferably coagulated by adding an alkali metal ion to the reaction mixture after the reaction.

A coagulating agent for the polymer is a reagent that inhibits ionization of a hydrophilic group of a surfactant to weaken the surface activating capability of the surfactant and cause the polymer to agglomerate due to hydrophobic interaction. As such a coagulating agent, aluminum potassium sulfate, triethylenetetramine, sodium hydroxide, potassium hydroxide, sodium chloride, magnesium chloride, calcium chloride, hydrochloric acid, sulfuric acid, sodium sulfate and the like have been conventionally used. However, an alkali metal ion alone cannot afford sufficient coagulation force; therefore, for example, sodium hydroxide has been used in combination with a polyvalent metal ion. In particular, it was considered in the present invention that since an alkali metal salt and the like of surfactin is used as a surfactant, an alkali metal ion alone cannot reduce the surface activating capability of the surfactin salt and cannot coagulate the polymer. Contrary to such an expectation, however, it was found that the polymer can be coagulated even if an alkali metal ion alone is added to the reaction mixture after the reaction.

The alkali metal ion is exemplified by a sodium ion, a potassium ion and a lithium ion, a sodium ion and a potassium ion are preferred, and a sodium ion is more preferred. Use of the alkali metal ion in the form of a salt results in increased convenience. The example of such a salt includes a halide salt such as a chloride and bromide, a sulfate, a carbonate and a hydrogencarbonate. It is convenient to add an aqueous solution of the alkali metal ion salt to the reaction mixture.

An amount of the alkali metal ion to be used may be adjusted within such a range that the polymer can be sufficiently coagulated. The temperature at which the polymer is coagulated is not particularly restricted and may be appropriately adjusted, and for example, the temperature is preferably adjusted to not lower than 5° C. and not higher than 50° C.

(3) Step of Separating Polymer

The polymer can be separated from the liquid phase regardless of whether the above-described coagulation step is carried out or not. The present step makes it possible to separate the polymer from the liquid phase which contains a surfactant, and also makes it possible to further reduce the amount of a surfactant which is mixed into the polymer. It is however noted that the present step may be optionally carried out, and a mixture of the polymer and the liquid phase may be directly used as described above.

As a method for separating the polymer and the liquid phase from each other, a conventional method may be applied. For example, filtration or centrifugal separation may be used. Alternatively, it is also possible to leave the mixture resulting from the above-described coagulation step at rest to allow the coagulated polymer to deposit, and subsequently remove the supernatant liquid phase by decantation or the like.

(4) Step of Coagulating Surfactin Salt

The liquid phase obtained through the above-described step of separating the polymer contains the surfactin salt. In the present step, the amount of the surfactin salt in the liquid phase is attempted to be reduced by coagulating the surfactin salt. Since the amount of the surfactant in the liquid phase can be reduced by the present step, an influence on the environment can be reduced even if the liquid phase obtained in the present step is drained to the environment, and it becomes easier to treat waste water.

It is extremely difficult to coagulate a general surfactant as a solid from the solution thereof. However, the inventors of the present invention found that it is possible to coagulate the surfactin salt by adding a polyvalent metal ion to a solution of the surfactin salt.

The polyvalent metal ion means a divalent or greater metal ion. The example of the polyvalent metal ion includes an alkaline earth metal ion such as a magnesium ion and a calcium ion; and a trivalent metal ion such as an aluminum ion.

It is convenient to use the polyvalent metal ion in the form of a salt. The example of such a salt includes a halide salt such as a chloride and bromide, a sulfate and a carbonate. With respect to the polyvalent metal ion, it is easier to add an aqueous solution thereof to the reaction mixture.

An amount of the polyvalent metal ion to be used may be appropriately adjusted within such a range that the surfactin salt can be sufficiently coagulated. For example, the polyvalent metal ion may be added in an equimolar or greater amount relative to the surfactin salt to be used. On the one hand, the upper limit is not particularly restricted and for example, the above ratio may be adjusted to not more than about 20 times by mole.

The temperature at which the surfactin is coagulated is not particularly restricted and may be appropriately adjusted. For example, the temperature is preferably adjusted to not lower than 5° C. and not higher than 50° C.

(5) Step of Separating Surfactin Salt

The surfactin salt coagulated by the above-described step of coagulating the surfactin salt can be separated from the liquid phase. The surfactin salt as a surfactant is removed from the obtained liquid phase and therefore, the content thereof is remarkably reduced. Accordingly, the liquid phase obtained in the present step can be directly drained, or the treatment thereof is extremely easy. In addition, for example, the separated surfactin salt can be dissolved again by treatment with a large amount of an alkali metal ion or quaternary ammonium ion in order to be rendered reusable.

As a method for separating the coagulated surfactin salt from the liquid phase, the method described above as a method for separating the polymer from the liquid phase can be used.

With respect to the polymer produced by the present invention method, the amount of a surfactant mixed therein, i.e. the amount of the surfactin mixed therein, is remarkably reduced. Specifically, the content amount of the surfactant is not more than 0.1% by mass.

Conventionally, into a polymer produced by emulsion polymerization or suspension polymerization, a surfactant, which is a constituent of a micelle, or a water-soluble polymer, which is a stabilizer for a liquid drop, have been inevitably mixed; and as a result, properties inherent in the polymer have been impaired. For example, it has been known that remaining of such a surfactant in a polymer produced as a modifier for a general-purpose resin greatly damages properties of the general-purpose resin to which the polymer is mixed, and causes deterioration in performance, such as undesired coloration, decrease in strength and durability.

On the one hand, the content of a surfactant in the polymer produced by the present invention method is remarkably reduced. The polymer therefore does not suffer from any bad influences due to a surfactant and is of high quality.

The present application claims the benefit of the priority date of Japanese patent application No. 2013-52288 filed on Mar. 14, 2013. All of the contents of the Japanese patent application No. 2013-52288 filed on Mar. 14, 2013, are incorporated by reference herein.

EXAMPLES

Hereinafter, the present invention is described in more detail with Examples. However, the present invention is not restricted to the following Examples in any way, and it is possible to carry out the present invention according to the Examples with an additional appropriate change within the range of the above descriptions and the following descriptions. Such a changed embodiment is also included in the technical scope of the present invention.

Unless otherwise noted, the term "part" represents a part by mass. The meanings of the abbreviations described below are as follows.

MMA: methyl methacrylate
BA: n-butyl acrylate
AMA: allyl methacrylate

Example 1

Into a glass reactor equipped with a thermometer, a stirrer, a reflux condenser, a nitrogen flow device, and a device for adding a monomer and an emulsifier, 200 parts of distilled water and 0.01 parts of sodium surfactin were added. While the mixture was stirred in a nitrogen flow, the temperature thereof was raised up to 50° C. Then, a mixture of 10.0 parts of BA, 0.04 parts of AMA and 0.001 parts of t-butyl hydroperoxide was added thereto; and 10 minutes after, a solution of 0.2 parts of sodium sulfoxylate formaldehyde dissolved in 5 parts of distilled water and a solution of 0.005 parts of disodium ethylenediaminetetraacetate and 0.0025 parts of ferrous sulfate heptahydrate dissolved in 5 parts of distilled water were added thereto. The mixture was stirred for 1 hour to complete polymerization.

Even when about 0.0996 parts of sodium surfactin was used to 100 parts of the monomers as described above, a rubbery copolymer latex having an average particle diameter of 0.2 µm could be produced in a conversion rate of 90.9%.

Example 2

A rubbery copolymer latex was produced in a similar condition to Example 1 except that the amount of sodium surfactin to be used was changed to 0.001 parts. As a result, an emulsion polymerization reaction proceeded even though the amount of used sodium surfactin was reduced to about 0.00962 parts to 100 parts of the monomers, and a rubbery copolymer latex having an average particle diameter of 0.5 µm was produced in a conversion rate of 79.5%.

Comparative Examples 1 and 2

Emulsion polymerization was carried out in a similar condition to Example 2 except that the kind of a surfactant was changed to sodium lauroyl glutamate, which is also an anionic emulsifier. However, micelles were not stabilized and a large amount of scale was generated; as a result, a latex could not obtained.

Then, the amount of the emulsifier was increased to the same amount as that of Example 1, but no change in result occurred. Specifically, a large amount of scale was formed; as a result, a latex could not obtained.

Example 3

Into a glass reactor equipped with a thermometer, a stirrer, a reflux condenser, a nitrogen flow device, and a device for adding a monomer and an emulsifier, 200 parts of distilled water and 0.002 parts of sodium surfactin were added. While the mixture was stirred in a nitrogen flow, the temperature thereof was raised up to 50° C. Then, a mixture of 1.0 parts of BA, 0.005 parts of AMA and 0.0001 parts of t-butyl hydroperoxide was added thereto; and 10 minutes after, a solution of 0.025 parts of sodium sulfoxylate formaldehyde dissolved in 5 parts of distilled water and a solution of 0.001 parts of disodium ethylenediaminetetraacetate and 0.0003 parts of ferrous sulfate heptahydrate dissolved in 5 parts of distilled water were added thereto. After the mixture was stirred for 1 hour, a monomer mixture composed of 85.5 parts of BA, 1.71 parts of AMA and 0.025 parts of t-butyl hydroperoxide was added dropwise over 5 hours. With the addition of the monomer mixture, a 5 mass % aqueous solution of 0.006 parts of sodium surfactin was continuously added over 5 hours. Stirring was continued for 1.0 hour from the end of the addition of the monomer mixture.

Even when about 0.00907 parts of sodium surfactin was used to 100 parts of the monomers as described above, a rubbery copolymer latex having an average particle diameter of 0.8 µm could be produced in a conversion rate of 68.7%.

To the above rubbery copolymer latex, 12.0 parts of MMA, 1.5 parts of BA as graft monomer components and 0.05 parts of t-butyl hydroperoxide were continuously added at 50° C. over 1 hour. After the end of the addition, 0.03 parts of t-butyl hydroperoxide was further added, and stirring was continued for additional 1 hour to complete polymerization. The conversion rate of the graft monomer components was 72.0%.

To the reaction solution after the above-described graft polymerization, a small amount of a saturated aqueous sodium chloride solution which contained a sodium ion in an equimolar or greater amount relative to the used sodium surfactin was added in order to coagulate the graft copolymer. The coagulated graft copolymer was collected by filtration from the resulting mixture and then dried under reduced pressure, affording a white powdery resin.

Example 4

To the filtrate resulting from the collection of the graft copolymer by filtration in the above-described Example 3, a saturated aqueous calcium chloride solution containing a calcium ion in an equimolar or greater amount relative to the used sodium surfactin was added. As a result, sodium surfactin was deposited in the form of calcium surfactin. The deposited calcium surfactin was collected by filtration and the dissolved percentage of a surfactin salt contained in the filtrate, which corresponded to waste water, was measured by HPLC. As a result, it was confirmed that the filtrate contained the used surfactin salts in an amount of mere not more than 0.5% by mass and the COD concentration of the filtrate, i.e. waste water, was a very low value as about 10 ppm.

Photographs taken before and after adding calcium ion to a 0.05 mass % aqueous sodium surfactin solution are demonstrated as FIG. 1 for reference. As shown in FIG. 1(1), sodium surfactin was dissolved completely before addition of calcium ion. The white part in the upper part of FIG. 1(1) was composed of bubbles formed by sodium surfactin as a surfactant. On the one hand, as shown in FIG. 1(2), when 1 mL of a saturated aqueous calcium chloride solution was added to about 150 mL of a 0.05 mass % aqueous sodium surfactin solution, it was observed that the bubbles disappeared, and surfactin became insolubilized by calcium ion to form calcium surfactin and deposited in the lower part.

Example 5

Into a glass reactor equipped with a thermometer, a stirrer, a reflux condenser, a nitrogen flow device, and a device for adding a monomer, 200 parts of distilled water and 100 parts of BA were added and then, 0.08 parts of sodium surfactin was added thereto. The mixture was stirred for 1 hour. Then, though the stirring was stopped and the mixture was left to stand at 50° C. for 2 hours, a similar state where liquid drops were stabilized was maintained.

Thus, it was confirmed that even when 0.08 parts of sodium surfactin to 100 parts of a monomer was used, stable liquid drops were obtained by stirring due to high emulsifying capability of sodium surfactin, and it was possible to carry out suspension polymerization.

Example 6

An experiment was carried out in a similar condition to Example 5 except that the amount of sodium surfactin was changed to 0.002 parts. As a result, formation of stable liquid drops was confirmed as in Example 5.

Comparative Examples 3 and 4

An experiment was carried out in a similar condition to Example 6 except that the kind of a surfactant was changed to sodium lauroyl glutamate, which is also an anionic emulsifier. As a result, oil separation occurred upon stopping stirring and liquid drops could not be confirmed.

Then, the amount of the emulsifier was increased to the same amount as that of Example 5, but no change in result occurred as oil separation occurred upon stopping stirring and liquid drops could not be confirmed.

The invention claimed is:

1. A method for producing a polymer,
comprising the step of polymerizing a monomer having a vinyl group in an aqueous medium in the presence of a polymerization initiator and a surfactin salt represented by the following formula (I):

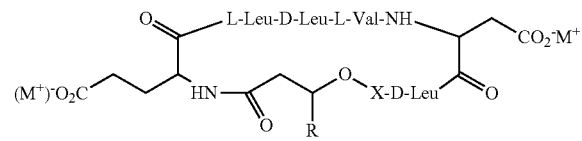

wherein 'X' is a residue of an amino acid selected from leucine, isoleucine and valine;
'R' is a $C_{9-18}$ alkyl group;
'$M^+$' is an alkali metal ion or a quaternary ammonium ion;
wherein a ratio of the surfactin salt (I) to 100 parts by mass of the monomer is not less than 0.0005 parts by mass and less than 0.1 parts by mass.

2. The method according to claim 1,
further comprising the steps of:
separating the obtained polymer from the liquid phase;
adding a polyvalent metal ion to the separated liquid phase in order to coagulate the surfactin salt; and
separating the coagulated surfactin salt.

3. The method according to claim 2, wherein further comprising the step of adding an alkali metal ion to the polymerization reaction mixture in order to coagulate the polymer after the step of polymerizing the monomer and before the step of separating the polymer.

4. The method according to claim 1, wherein the ratio of the surfactin salt (I) to 100 parts by mass of the monomer is not more than 0.05 parts by mass.

5. The method according to claim 1, wherein the monomer is a (meth)acrylic acid-based monomer.

* * * * *